March 8, 1966   R. F. GOINARD   3,238,587
AUTOMATICALLY RELEASABLE BUCKLE FOR A SAFETY BELT
Filed May 2, 1963   2 Sheets-Sheet 2
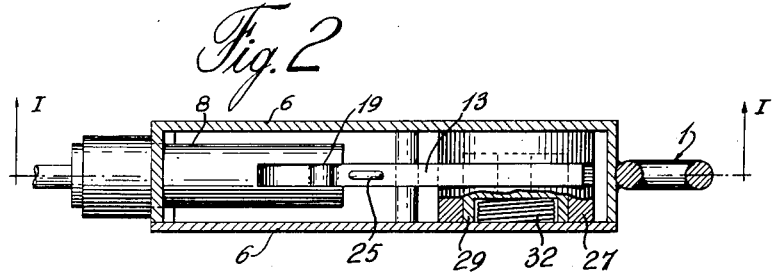
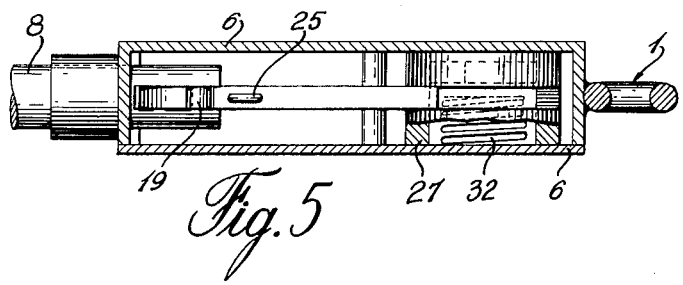
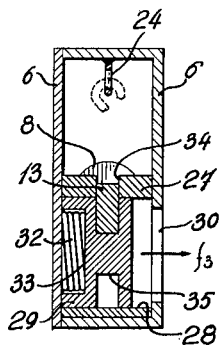
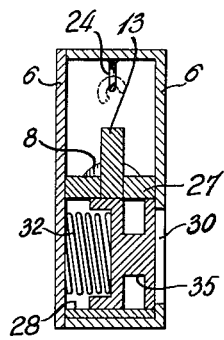
INVENTOR
Robert F. GOINARD
ATTORNEYS

United States Patent Office 3,238,587
Patented Mar. 8, 1966

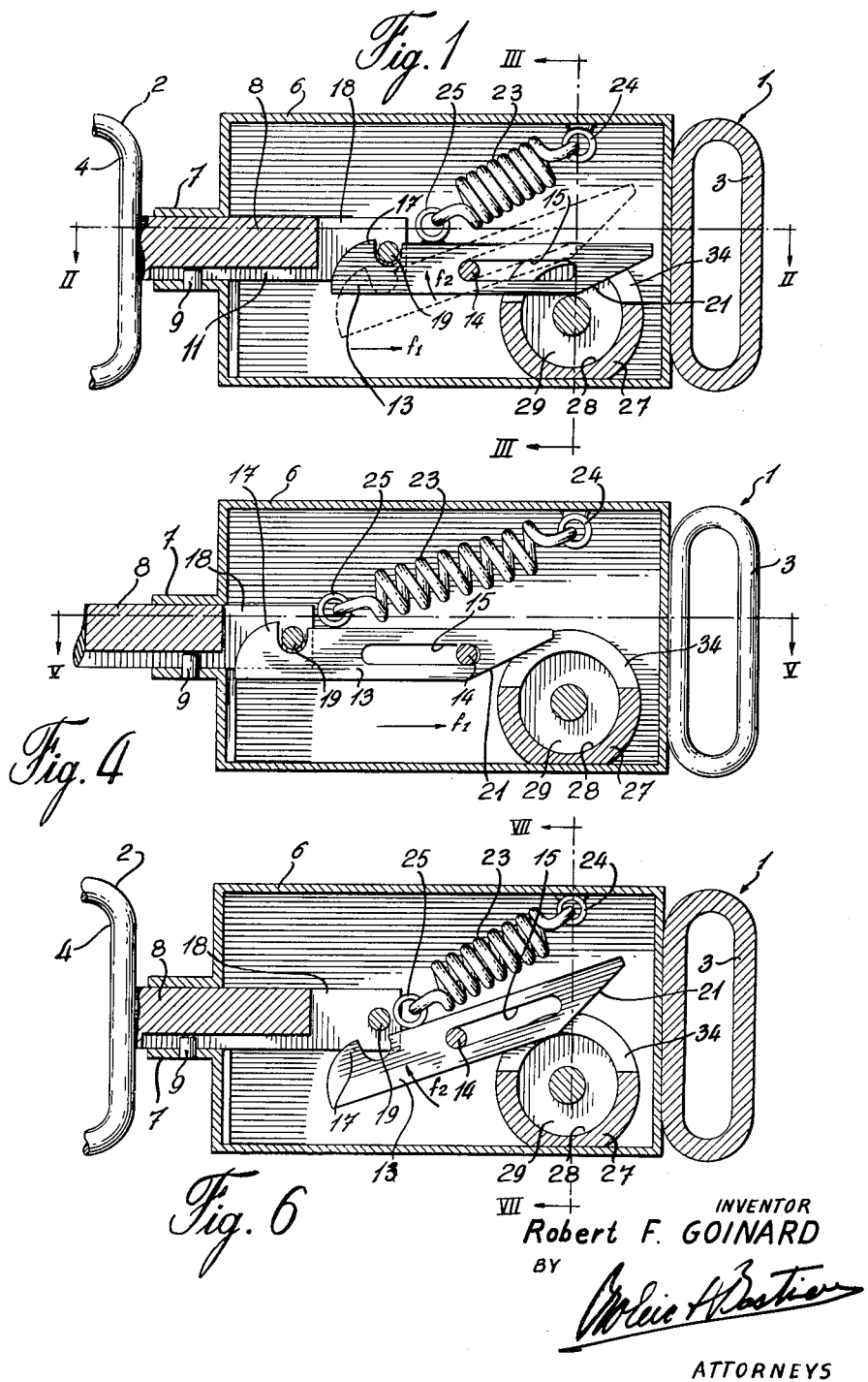

3,238,587
AUTOMATICALLY RELEASABLE BUCKLE FOR
A SAFETY BELT
Robert Florentin Goinard, 79 Rue Aristide Briand,
Saint-Nazaire, France
Filed May 2, 1963, Ser. No. 277,584
Claims priority, application France, July 30, 1962,
905,491
5 Claims. (Cl. 24—230)

The invention relates to the safety belts used by the passengers in vehicles, notably motor vehicles.

Heretofore, safety belts of this type have been provided with a system for opening and closing which can be manipulated by hand. In the case of a shock or impact, they reliably fulfill their task of retaining the passenger, but if the latter is to be freed they require the intervention of a third person. This intervention obviously constitutes an inconvenience which makes users hesitate to adopt such belts.

It is an important object of the invention to provide a safety belt buckle which is automatically released after having undergone a traction force under the effect of a considerable shock or impact.

A further object of the invention is to provide a buckle comprising on the one hand two separable elements which are intended to be attached respectively to the two ends to be joined of a belt and, on the other hand, a mechanism for preventing the said two elements from being separated under the effect of a traction force exerted on the belt, but permitting the free separation thereof as soon as the said traction force ceases to be effective.

Also it is an object of the invention to provide one of the two separable elements (the principal element) carrying a means for securing the other element (auxiliary element) which is movable on the said principal element and is subjected to the action of resilient recall means which are so dimensioned as to give way under the effect of an excessive traction force exerted on the belt, whereas a movable cam in the said main member is designed and arranged in such manner as to be capable of taking up a position, under the urging of resilient means, on the return-travel path of the said securing member, when the latter is recalled under the action of its recall means, the said securing member being designed and arranged in such manner that the cam disposed on its return-travel path compels it to adopt a position wherein it frees the auxiliary element of the buckle, the said cam being maintained externally of the path of travel of the securing member, by the latter, until the end of its outward travel under the action of the aforesaid excessive traction force.

An additional object of the invention is to provide the cam consisting of a block of generally cylindrical form mounted in a corresponding recess in the main element of the buckle, the resilient means for urging the said cam consisting of a spring disposed in the bottom of the said recess whereas, due to the opening of the said recess, it is possible, against the action of the said spring, to depress the cam axially so as to displace it into the withdrawn and "cocked" position.

Further and other objects and advantages of this invention reside in the combination and arrangement of parts, to be hereinafter described, when considered in conjunction with the drawing forming a part of this specification and pointed out with particularity in the appended claims.

In the said drawings:

FIG. 1 is a section through the assembly of the buckle, which is assumed to be closed, taken along the line I—I of FIG. 2;

FIG. 2 is a section along the line II—II of FIG. 1;

FIG. 3 is a section along the line III—III of FIG. 1;

FIG. 4 is a section similar to that of FIG. 1 showing the buckle stretched to the maximum degree;

FIG. 5 is a section taken along the line V—V of FIG. 4;

FIG. 6 is a section similar to those of FIGS. 1 and 4, showing the buckle in the released position, and, FIG. 7 is a section along the line VII—VII of FIG. 6.

The automatic-release buckle for a safety belt shown in the drawings comprises two essential elements designated, in assembly, 1 and 2 and comprising rings of elongated form 3 and 4 in which the two ends to be joined of the safety belt are to be attached.

The element 1 or the principal element comprises a housing 6 of parallelepipedic shape having, on one of its small faces, a cylindrical guide 7 in which a rod 8 fast with the element 2 or auxiliary element is able to slide. A catch 9, projecting into the bore of the guide 7, penetrates into a longitudinal groove 11 in the rod 8 and prevents the latter from rotating relatively to the housing 6.

The cylindrical rod 8 of the auxiliary element 2 is able to project completely out of the housing 6 in the principal element 1 but it can be retained in the said housing by a device comprising a securing member 13 mounted in the housing 6 in such manner as to be able to slide therein in the same direction as the rod 8 and to be able to rotate about an axis transversely of that direction. For this purpose, the connection between the securing member 13 and the housing consists of a pivot 14 mounted in a groove 15 of elongated shape in a direction parallel to that of displacement of the rod 8; in the example illustrated the pivot 14 is fast with the housing and the slot 15 is formed in the securing member 13. The latter has the form of an elongated plate terminating at one of its ends in a hook 17 which is able to engage in a slot or mortise 18 in the inner end of the rod 8 and to become fast on a pivot or a catch 19 secured through the walls of the said slot. The other end of the securing member 13 is formed with a bevelled face 21 facing in the direction opposite to that of the hook 17.

A spring 23, one end of which is attached to an eyepiece 24 secured in the housing and the other end of which is secured to an eyepiece 25 secured on the edge of the securing member 13, on the side of the hook 17, tends simultaneously to cause the sliding of the securing member 13 in the direction of the arrow $f_1$ (FIG. 1) and to pivot it about the pivot 14 in the direction of the arrow $f_2$, so as to tend simultaneously to retain the auxiliary element 2 of the buckle and to maintain the hook 17 engaged on the pivot 19 of the said element.

Secured in the bottom of the housing 6, near the bevelled end 21 of the securing lever 13 is a block 27 having a bore 28 the axis of which is parallel to the pivoting axis 14 of the securing lever 13. In the bore 28, a cam 29, the general shape of which is also cylindrical, is able to slide, the said cam being urged in the direction of the arrow $f_3$ (FIG. 3) by a spring 32 interposed between the wall of the housing 6 and the bottom of a recess 33 in the cam 29. The block 27 is formed with a slot 34 and the cam 29 with an annular groove 35 into which is able to penetrate the corresponding end of the securing member 13. It is possible to displace the cam 29 against the action of the spring 32, through an aperture 30 in the housing.

The general arrangement of the members is such that, when the securing member 13 is engaged in the annular groove 35 of the cam 29 (FIGS. 1 and 3), the hook 17 can be engaged on the pivot 19 for retaining the auxiliary element 2 of the buckle, whereas, on the contrary, when the securing member 13 bears against the cylindrical outer surface of the cam 29 (FIGS. 6 and 7), the hook 17 is maintained spaced from the securing pivot 19.

The mode of operation is as follows:

When the buckle is closed, all its members are in the positions illustrated in FIGS. 1 to 3, i.e., the hook 17 of the member 13 is in engagement with the pivot 19 of the rod 8 of the auxiliary element 2, under the action of the recall spring 23, the bevelled end 21 of the said securing member being engaged in the annular groove 35 of the cam 29 the recall spring 32 of which is maintained compressed by the said end of the securing member.

Under the effect of a strong traction force exerted by the belt the two ends of which are respectively secured to the main element 1 and to the auxiliary element 2 of the buckle, the rod 8 is displaced in the direction opposite to that of the arrow $f_1$ (FIG. 4) against the action of the recall spring 23, until the end of the securing member 13 provided with the hook abuts against the inner wall of the housing 6. Under these conditions, the auxiliary element 2 is firmly retained secured to the principal element 1 of the buckle by the hook 17 engaged on the pivot 19, from which it cannot be disengaged in view of the traction force exerted on it by the spring 23. A passenger in a motor vehicle for example which may be equipped with the present belt is thus effectively retained.

As soon as the bevelled end 21 of the securing member 13 has left the annular groove 35 of the cam 29, the latter, urged by the spring 32, takes up the position illustrated in FIG. 7.

As soon as the force tending to separate the two elements of the buckle from each other ceases, the recall spring 23 restores the rod 8 of the auxiliary element 2 towards the interior of the housing (FIG. 6) but the bevelled end 21 of the securing member 13 then encounters the external cylindrical surface of the cam 29 sliding on the said surface and pivoting the securing member 13 in the direction opposite to that of the arrow $f_2$. The hook 17 is disengaged from the pivot 19, in such manner that the rod 8 of the auxiliary member 2 of the buckle is maintained freed and is able to emerge freely from the housing 6. The passenger is thus not retained a "prisoner" in his belt, even if he is incapable of releasing himself.

In order to initially close the buckle and to re-cock the mechanism thereof, it suffices to depress the rod 8 of the auxiliary member 2 in the guide 7 of the housing and to exert on the cam 29, through the aperture 30 in the housing, a pressure in the direction opposite to that of the arrow $f_3$ (FIG. 3), against the action of the spring 32, in such manner as to depress the said cam into the position illustrated in FIG. 3. The annular groove 35 in the said cam is then opposite the corresponding end of the securing member 13 which can be engaged in the said groove and retain the cam against the action of the spring 32, in such manner that all the members are restored into the relative initial positions illustrated in FIGS. 1 to 3.

Of course, the invention is not limited to the mode of embodiment described and illustrated; it would be possible to make numerous modifications without exceeding the scope of the invention. It is obviously possible to add a safety belt comprising an automatically releasing buckle according to the invention any additional conventional securing device such as may appear to be appropriate or desirable.

What I claim is:

1. An automatically releasable buckle for safety belts comprising:
    (a) a housing secured at one end thereof to one end of the belt;
    (b) guiding means provided at the other end of the housing and defining a bore leading into said housing;
    (c) rod means secured to the other end of the belt and adapted to slide within said guiding means;
    (d) a securing member within said housing mounted for sliding in the same direction as the rod means and for pivotable movement about an axis transversely of said direction and adapted to engage with said rod means;
    (e) spring means between said housing and the securing member for urging said securing member into a position wherein it is firmly engaged with said rod means;
    (f) and resiliently actuated cam means positioned within the housing and cooperating with the securing member which is thereby disengaged from the rod means after sliding of said securing member against the action of the spring means and when the securing member is returned to a normal position by the spring means.

2. An automatically releasable buckle for safety belts according to claim 1, in which said rod means are provided with catch means at the free end thereof.

3. An automatically releasable buckle for safety belts according to claim 2, in which said securing member is in a form of a plate having at one of its ends hook means adapted to engage with the catch means of the said rod means and at the other end a bevelled face adapted to cooperate with the cam means.

4. An automatically releasable buckle for safety belts according to claim 3, in which the cam means consist of a generally cylindrical cam sliding within the housing in a direction transverse to that of the securing member and provided with an annular groove adapted to receive the end of the securing member with the bevelled face when said groove is in line therewith, said cam being actuated by a spring so that when said end of the securing member with the bevelled face has been withdrawn from the groove, the latter will be no longer in line therewith.

5. An automatically releasable buckle for safety belts comprising:
    (a) a housing having the form of a generally flat, parallelepipedic box with two small vertical walls, two large vertical walls and two horizontal walls, one of the small vertical walls being secured to a first element to which one end of the belt is connected;
    (b) a cylindrical guide provided at the other small vertical wall of the housing and defining a bore leading into said housing;
    (c) a cylindrical rod fast with a second element to which the other end of the belt is connected, said rod being adapted to slide within said guide and being provided with a longitudinal groove and with a slot at the free end thereof;
    (d) a catch within the cylindrical guide, projecting into the longitudinal groove of the cylindrical rod to prevent rotation of the latter relative to the housing;
    (e) a first pivot secured through the walls of the slot at the free end of the cylindrical rod;
    (f) a second pivot positioned within the housing and secured to the large vertical walls thereof;
    (g) a securing member in the form of a plate within said housing, said member being provided with an elongated groove and mounted on said second pivot which passes through said groove so that said securing member can slide in substantially the same direction as said rod and pivot about an axis transversely of said direction; said securing member being at one end in the form of a hook adapted to engage with said first pivot, and at the other end having a bevelled face facing in the direction opposite to that of the hook;
    (h) a spring attached by one of its ends to the housing and by the other to the securing member on the side of the hook and acting on said member so as to urge it towards the small vertical wall of the housing to which the first element is secured and simultaneously towards engagement of the hook with the first pivot;
    (i) a block mounted within said housing between the two large vertical walls thereof, said block having a bore the axis of which is parallel to that of the second pivot, and a slot adapted to receive the end with the bevelled face of the securing member;

(j) a cam of a generally cylindrical shape mounted within the bore of said block and adapted to slide therein, said cam being provided with an annular groove which, when in line with the slot of said block, is also adapted to receive said end with the bevelled face of the securing member;

(k) and spring means between said cam and one of the large vertical housing walls urging said cam against the other large vertical wall which is provided with an aperture through which the cam can be depressed against the action of the spring means, said spring means actuating the cam in such a way that when the end with the bevelled face of the securing member has been withdrawn from the groove the latter will be no longer in line with the slot in the block.

References Cited by the Examiner

UNITED STATES PATENTS

| | | | |
|---|---|---|---|
| 2,637,576 | 5/1953 | Nottingham | 24—230 |
| 2,763,451 | 9/1956 | Moran | 24—230 |
| 2,852,217 | 9/1958 | Engelhardt | 244—151 |

FOREIGN PATENTS 690,896  4/1953  Great Britain.

WILLIAM FELDMAN, *Primary Examiner.*

DONLEY J. STOCKING, *Examiner.*